April 9, 1946.    R. L. LINCOLN    2,398,233
DUST COLLECTOR
Filed May 10, 1944    2 Sheets-Sheet 1

Inventor.
Roland L. Lincoln.
by Robert J. Palmer
Attorney.

April 9, 1946.   R. L. LINCOLN   2,398,233
DUST COLLECTOR
Filed May 10, 1944   2 Sheets-Sheet 2

Inventor.
Roland L. Lincoln.
by Robert T. Palmer
Attorney.

Patented Apr. 9, 1946

2,398,233

UNITED STATES PATENT OFFICE 2,398,233

DUST COLLECTOR

Roland L. Lincoln, Dover, Mass., assignor to B. F. Sturtevant Company, Boston, Mass.

Application May 10, 1944, Serial No. 534,918

4 Claims. (Cl. 183—57)

This invention relates to dust collectors and relates more particularly to filter type dust collectors and to the removal of the dust collected by the filters thereof.

Filter type dust collectors have the advantages of high collection efficiencies and of compactness, but it has been so difficult to remove the dust collected by the filters that it is the general practice to discard dust clogged filters and to replace them with new ones. This practice results not only in increased expense due to the necessity for the frequent replacement of filters, but also in the inconvenience of shutting down the collectors at intervals for replacement of the filters.

This invention provides a filter type dust collector in which the filters are continuously rotated during collection, and which are continuously cleaned by suction applied to their surfaces.

A feature of this invention resides in the provision of a plurality of individual filter units, each composed of filter cloth stretched over an outer circular rod and a pair of inner circular rods with provision for readily assembling any desired number of the filter units alongside each other on a rotary shaft for building up dust collectors of different capacities.

Another feature of the invention resides in the provision of a plurality of rotary filter units having V-shaped collecting surfaces together with suction nozzles having complemental V-shaped surfaces for removing the dust from the filter surfaces.

Another feature of the invention resides in the provision of a plurality of rotary filter units, each provided with a suction nozzle, with provision for applying suction to the nozzles in succession.

Another feature of the invention resides in the provision of a plurality of filter units mounted on a rotary shaft, provided with individual suction nozzles mounted on a hollow shaft, through which suction is applied to the nozzles, the filter units being removable from one end of the rotary shaft, and the suction nozzles being rotatable on the hollow shaft for permitting removal of the filter units.

An object of the invention is to provide, in filter type dust collectors, for continuous removal of the dust collected by the filters.

The invention will now be described with reference to the drawings, of which:

Fig. 7 is a sectional view of one of the suction nozzles and is taken along the lines 7—7 of Fig. 8;

Fig. 8 is a sectional view along the lines 8—8 of Fig. 7, and

Fig. 9 is a sectional view along the lines 9—9 of Fig. 7.

Figure 1:
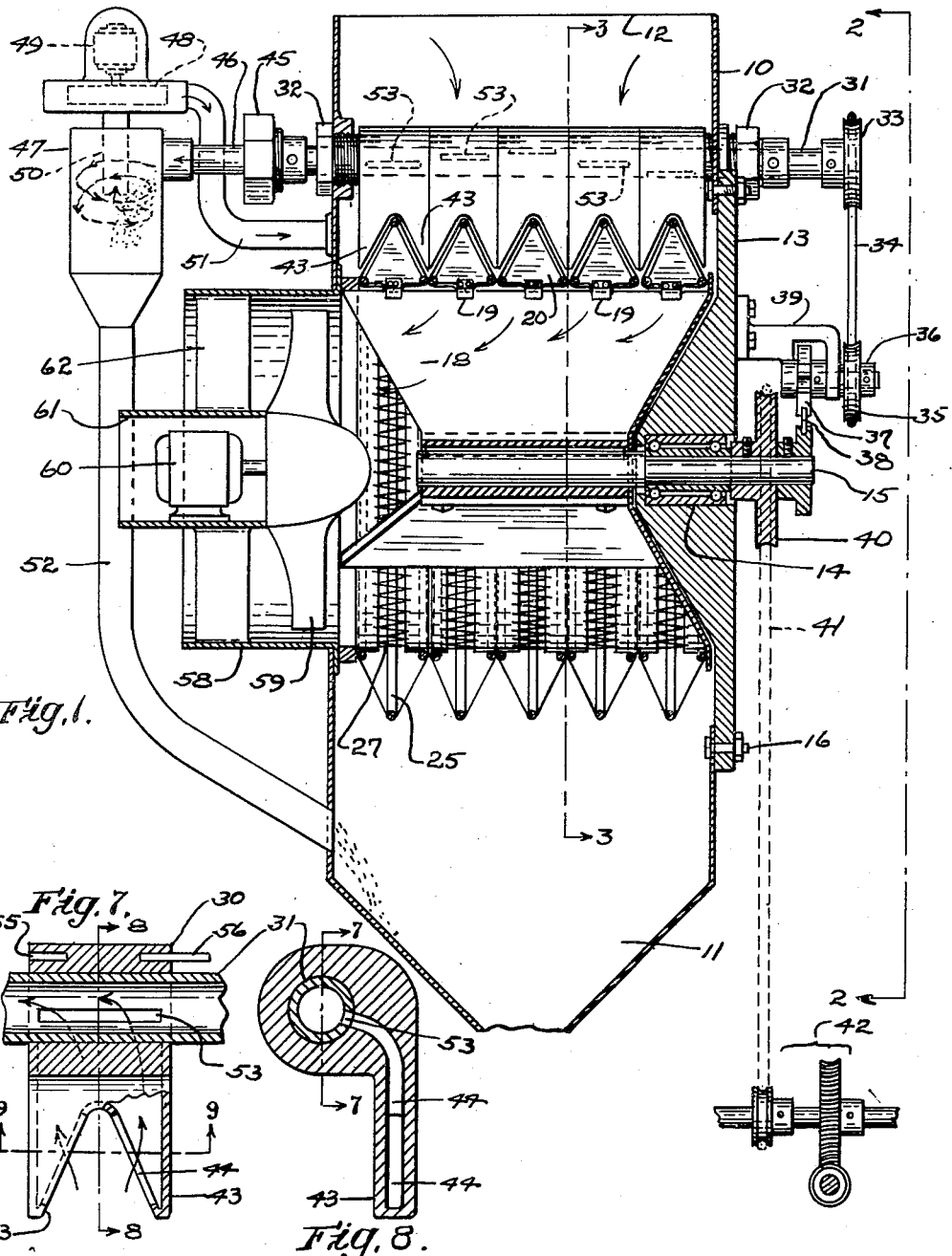
Fig. 1 is a view in vertical section of a dust collector embodying this invention.
Figure 2:
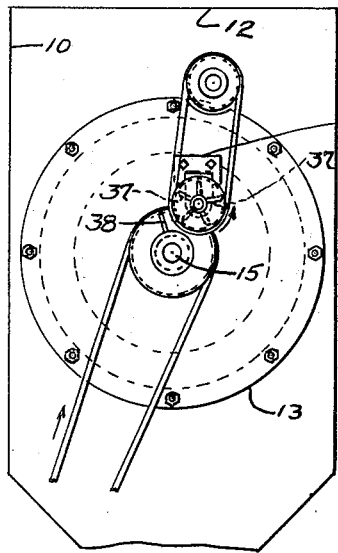
Fig. 2 is a reduced view along the lines 2—2 of Fig. 1.
Figure 4:
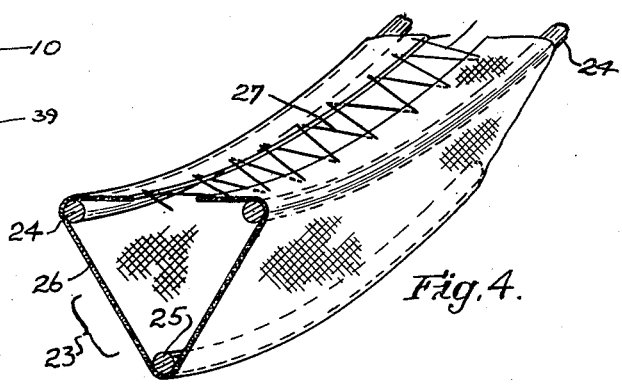
Fig. 4 is an enlarged projected view illustrating the application of the filter cloth to one of the filter units of Figs. 1 and 2.
Figure 6:
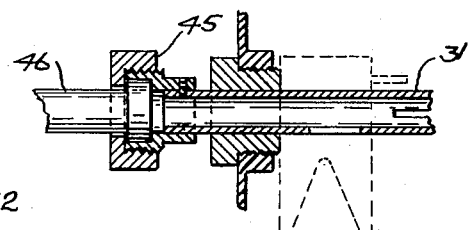
Fig. 6 is an enlarged view in section of the end adjacent the suction blower, of the hollow shaft upon which the suction nozzles of Fig. 1 are mounted.

The dust collector illustrated has the vertical side walls 10 which converge in their lower portions to form the hopper 11. The collector has the air inlet opening 12 at the upper ends of the walls 10.

One of the walls 10 has a large circular opening around which is attached by the bolts 16, the end plate 13. The plate 13 supports the bearing 14 for the rotary shaft 15.

The sleeve 17 which is keyed to the shaft 14 has bolted thereto the radial plates 18. The plates 20 formed as equilateral triangles, are attached by the screws 21 and the clamps 19 to the outer ends of the plates 18.

Each triangular plate 20 forms a support for each filter unit indicated generally by 23. Each unit 23 comprises two inner circular hoops 24 arranged the same radial distance from the shaft and attached, as by welding, to two of the apices of the triangular plate 20, and the outer hoop 25 attached to the other apex of the plate 20. The sheet 26 of filter cloth is stretched over the hoops 24 and 25 and atached thereto between the hoops 24, by the lacing 27.

As illustrated by Fig. 1, a number of filter units 23 may be supported alongside each other by the plates 18. Larger or smaller collectors than the one illustrated, may be provided by increasing or decreasing, respectively, the number of the filter units 23 used.

The suction nozzles 30 are rotatably supported upon the hollow shaft 31 which extends through and is supported for rotation in the air seals 32 which are threaded into opposite side walls 10 of the collector.

One end of the shaft 31 is closed and the pulley 33 is mounted thereon, and is rotated by the belt 34 from the pulley 35 on the shaft 36, which is rotatably attached by the bracket 39 to one of the walls 10 of the collector. The wheel with the five radial arms 37 is attached to the shaft 36. The wheel with the one arm 38 is mounted on the shaft 15 and upon rotation of the shaft 15, the arm 38 strikes and rotates the arms 37 causing rotation of the hollow shaft 31.

The shaft 15 is rotated by the pulley 40 which is attached thereto and by the belt 41 from a suitable speed reducing gear train 42 which may be driven by a conventional electric motor.

The suction nozzles 30 each has the extensions 43 which form therebetween a V-shaped opening, shaped complemental to the dust collecting surfaces of the filter units 23, the extensions 43 extending parallel to and closely spaced from the dust collecting surfaces when the nozzles and the filter units are assembled together as illustrated by Fig. 1.

The nozzles 30 have the slots 44 which extend from the shaft 31 through the extensions 43 as illustrated by Figs. 7, 8, and 9.

The other end of the hollow shaft 31 from that on which the pulley 31 is mounted, has mounted thereon the air seal 45 into which the pipe 46 extends. The pipe 46 connects tangentially with the secondary, cyclone type, dust collector 47.

The suction blower 48 driven by the electric motor 49, has its inlet connected to the tube 50 which extends vertically into the center of the secondary collector 47, and has its outlet connected by the tube 51 into the interior of the main collector. The dust separated by the secondary collector 47 passes through the pipe 52 into the hopper 11 of the main collector.

The hollow pipe 31 contains the staggered, horizontal slots 53 which are adapted, as the pipe 31 is rotated, to connect the slot 44 of each suction nozzle 30, successively with the suction applied to the interior of the pipe 31 by the blower 48. The rotary motion imparted to the pipe 31 through the arm 38 striking and rotating the arms 37, is intermittent so that the slots 53 in the pipe and the slots 44 in the nozzles are in alignment for sufficient periods of time for suction to be applied by each nozzle to the dust collecting surfaces of its respective filter unit 23 during one complete revolution thereof.

Figure 3:
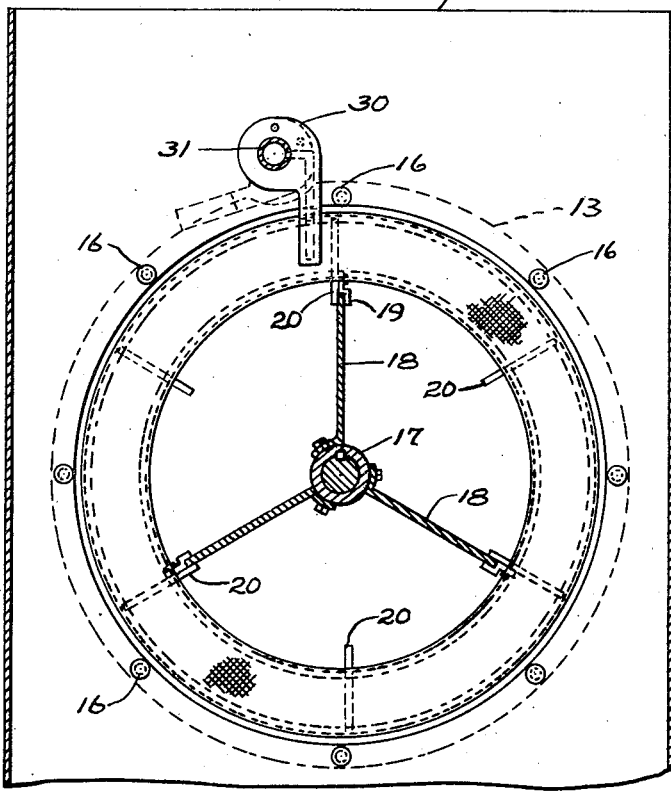
Fig. 3 is a sectional view along the lines 3—3 of Fig. 1.
Figure 5:
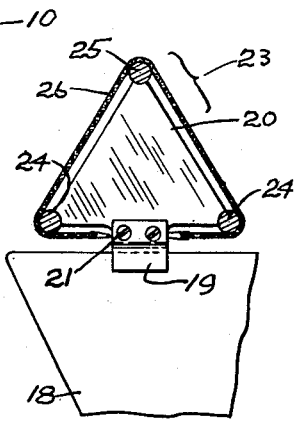
Fig. 5 is an enlarged view partially in section, illustrating how the filter cloth supporting rings are supported upon plates attached to a rotary shaft.

The nozzles 30 have the aligned slots 55 into which the pins 56 extend for interconnecting the nozzles, whereby all of the nozzles may be rotated simultaneously about the pipe 31 from the position shown by the continuous lines of Fig. 3 to the position shown by the dashed lines of Fig. 3, for displacing the nozzles so that the filter units 23 may be removed and replaced.

The units 23 may easily be removed and replaced by removal of the end plate 13, and the loosening of the screws 21 following which the units 23 may be removed from the plates 18 and new units inserted.

The wall 10 of the main collector opposite to that which supports the end plate 13, has a circular opening having a diameter slightly less than the inner diameter of the filter units 23, and the air outlet duct 58 is attached to the main collector around this opening.

The fan 59 driven by the motor 60 is supported in the duct 58 by the fairing 61 which in turn is supported from the duct by the spaced arms 62 which may be four in number.

In operation, the fan 59 draws air through the inlet 12 and through the filter surfaces of the filter units 23 and discharges it through the duct 58. Any dust in the air entering the inlet 12 is collected on the filter surfaces of the units 23.

The filter units 23 are rotated, as described in the foregoing, and much of the dust collected thereby is thrown off by centrifugal force and falls into the hopper 11.

The filter units are rotated by rotation of the shaft 15, as described, so that their dust collecting surfaces pass, once each revolution, the slots 44 in the suction nozzles 30.

The blower 48 applies suction to the nozzles 30, in succession, as the shaft 31 is rotated as described in the foregoing. The dust removed from the filter units by the suction from the blower 48, is separated in the secondary collector, and discharged through the pipe 52 into the hopper 11.

In the embodiment of the invention illustrated, there are five filter units 23 and the shaft 31 is so rotated and the slots 53 in the shaft 31 are so arranged, that each filter unit 23 has its surfaces cleaned once every five revolutions. This is sufficient to keep the filter cloth clean and since the vacuum blower applies suction to only one nozzle at a time, its size is not large, and the power it consumes is relatively small.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. A dust collector unit comprising a pair of substantially similar circular hoops, a third circular hoop having a larger diameter than said hoops, a rotary shaft, means spacing the hoops of said pair and supporting same from, and concentric with, said shaft and supporting said third hoop between said hoops of said pair and concentric with same, and a sheet of filter cloth stretched over said hoops.

2. A dust collector comprising a pair of substantially similar circular hoops, a third circular hoop having a larger diameter than said hoops, a rotary shaft, means spacing the hoops of said pair and supporting same from, and concentric with, said shaft and supporting said third hoop between said hoops of said pair and concentric with same, a sheet of filter cloth stretched over said hoops, a suction nozzle having portions straddling said third hoop and extending to points adjacent the hoops of said pair, means for rotating said shaft for revolving said cloth past said nozzle, and means for applying suction to said nozzle for removing dust from said cloth.

3. A dust collector unit comprising a pair of substantially similar circular hoops, a third hoop having a larger diameter than said hoop, a plurality of triangular plates attached at their apices to said hoops, means supporting said plates from said shaft, and a sheet of filter cloth stretched over said hoops.

4. A dust collector unit comprising a pair of substantially similar circular hoops, a third hoop having a larger diameter than said hoops, a plurality of triangular plates attached at their apices to said hoops, a plurality of plates attached to said shaft and extending radially therefrom to said triangular plates, means attaching said triangular plates to said radially extending plates, and a sheet of filter cloth stretched over said hoops.

ROLAND L. LINCOLN.